June 19, 1956  R. B. HOWELL, JR  2,750,994
CHAIR BACK ADJUSTING MECHANISM
Filed May 27, 1952  2 Sheets-Sheet 1
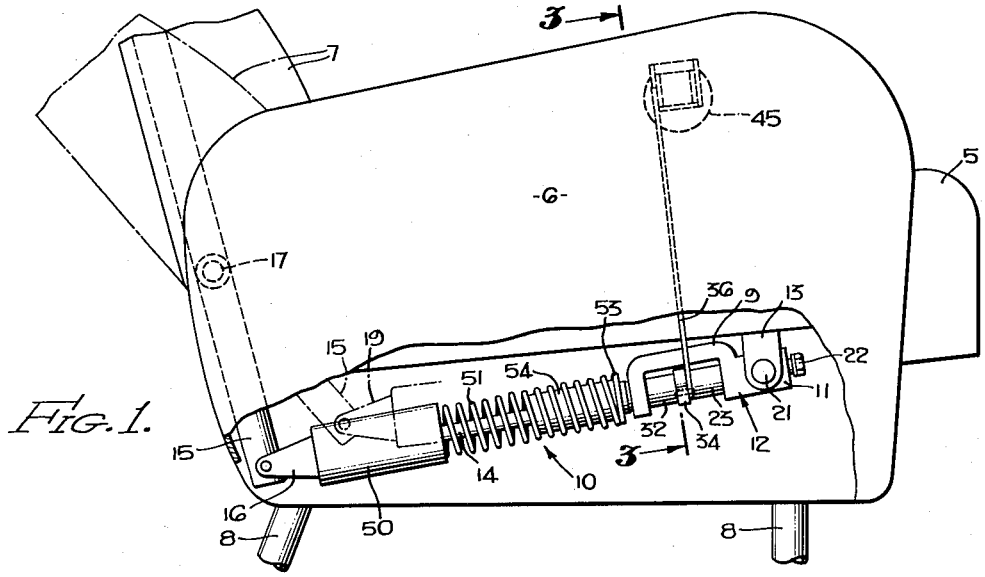
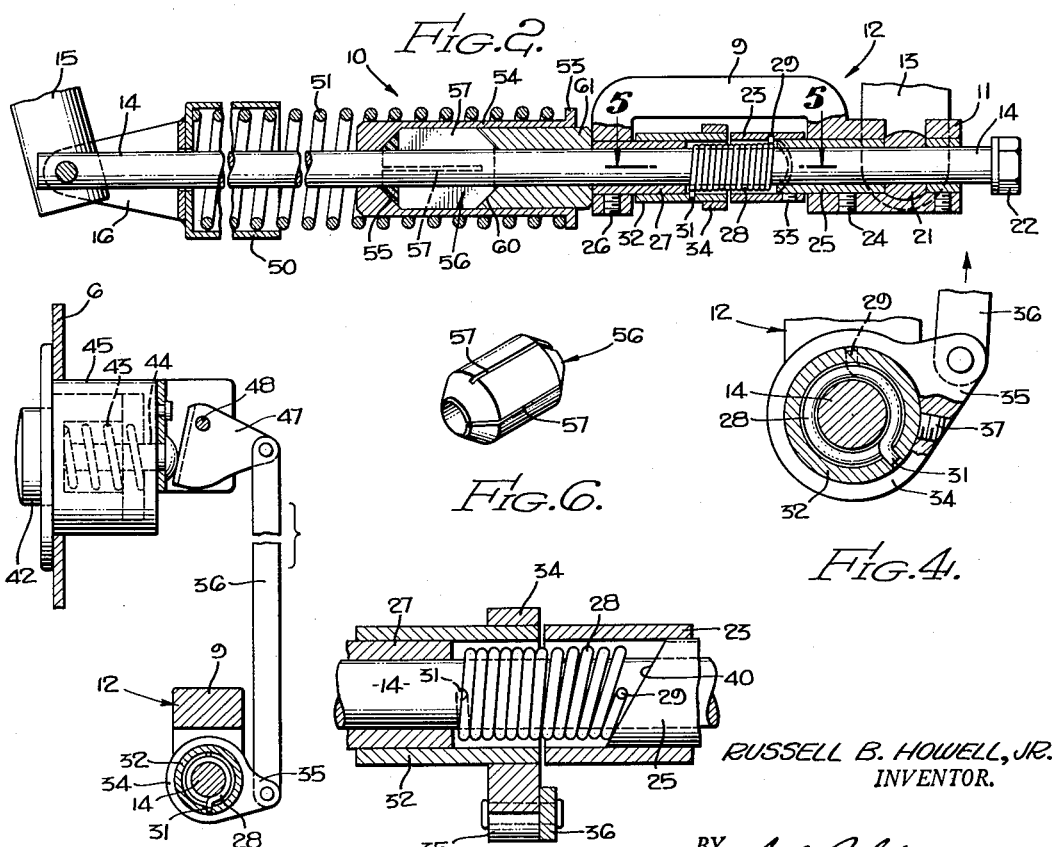
RUSSELL B. HOWELL, JR.
INVENTOR.
BY
ATTORNEY June 19, 1956 R. B. HOWELL, JR 2,750,994
CHAIR BACK ADJUSTING MECHANISM
Filed May 27, 1952 2 Sheets-Sheet 2

RUSSELL B. HOWELL, JR.
INVENTOR.

BY
ATTORNEY

United States Patent Office
2,750,994
Patented June 19, 1956

2,750,994

CHAIR BACK ADJUSTING MECHANISM

Russell B. Howell, Jr., Burbank, Calif., assignor to Burns Aero Seat Co., Inc., Burbank, Calif., a corporation of California Application May 27, 1952, Serial No. 290,223

15 Claims. (Cl. 155—161)

This invention relates to an adjustable clutch mechanism, and particularly to an adjustable rod locking mechanism for controlling the inclination of seat backs and similar devices.

Ratchet and rod clamping type mechanisms for adjusting seat backs are known. U. S. Patent No. 1,659,111 shows a spring clamped rod for window casements and transoms. The present invention is directed to such a type of adjusting mechanism, but one which has many advantages over the prior devices. Briefly, these advantages are that infinitely small adjustments may be made, that the locking is self-energizing, the mechanism may be released under load, and is snubbed for slow action in both directions to provide safety when used on airplane seats.

The mechanical features include the use of a friction element surrounding the positioning rod, the element being variable in its action according to the direction of movement of the seat back. For instance, a spring restores the seat back to a certain extreme position, upon release of the lock, the friction element controlling the speed of the restoring action to prevent the seat back from snapping into position. When the seat back is moved under pressure of the occupant, the friction action increases to increase the control of the seat back positioning by the occupant. Another mechanical feature is the use of a clamping spring on the rod which is released by rotation thereof to increase its internal diameter, the spring being so arranged in its housing that, with increased pressure on the seat back, there is an increased tightening of the spring around the rod. The locking mechanism also is self adjusting for wear.

The principal object of the invention, therefore, is to facilitate the adjustable positioning of movable elements, particularly the backs of seats of airplanes.

Another object of the invention is to provide an improved clutch mechanism which has a variable snubbing action according to the direction of movement of the controlled part.

A further object of the invention is to provide an adjustable clutch mechanism which is self-energizing to the extent of increasing the locking action with increased load.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a side view of the mechanism embodying the invention shown attached to an adjustable back of a seat.

Fig. 2 is a cross-sectional view of the clutch mechanism embodying the invention.

Fig. 3 is an elevational view of the manually operated lock release mechanism, taken along the line 3—3 of Fig. 1.

Fig. 4 is a detailed view of the spring lock mechanism.

Fig. 5 is a cross-sectional view taken along the line 5—5 of Fig. 2.

Fig. 6 is a perspective view of the friction applying element of the mechanism.

Figure 7:
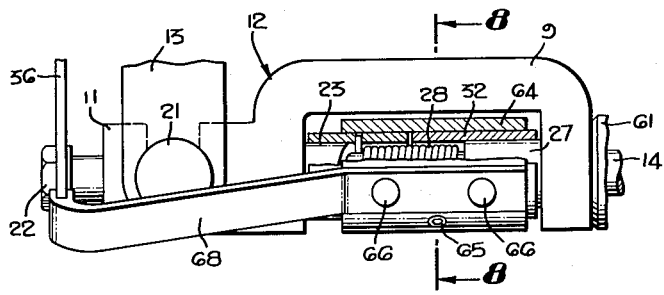
Fig. 7 is a detailed view showing a modification of the lock release mechanism of Fig. 3.

Referring now to the drawings, in which the same numerals identify like elements, a chair is shown having a seat portion 5, a side arm portion 6, a back portion 7, and supporting legs 8. The clutch mechanism shown generally at 10 has a lock body 12 made up of a large yoke section 9 and a smaller yoke section 11. Between the legs of section 11, is a flattened clevis pin 21 drilled to accommodate a slidable rod 14. The pin 21 passes through the ends of clevis 13, which hold body 12 in position. One end of slidable rod 14 is connected to a member 15 attached to the back 7 by a yoke or clevis 16. It will be noted that the seat back 7 and member 15 are pivoted at 17. The dotted lines 19 show a position of the unit 10 when the seat back 7 is in a reclining position, the other end of the rod 14 then extending beyond the body 12.

Referring now to Fig. 2 in particular, the rod 14 is slidable through the lock body 12 and through the clevis pin 21. On the end of the rod, is positioned a nut and washer combination 22, which limits the movement of the rod 14 in the left-hand direction.

Within a hole in one leg of yoke section 9, there is attached, by a set screw 24, a bevel ended sleeve 25. Fixedly attached in a hole in the other end of the yoke section 9 by set screw 26, there is a sleeve member 27. Between the inner ends of sleeves 25 and 27 and surrounding rod 14, is a coil spring 28 having one end thereof attached to a sleeve 23 fixedly held on sleeve 25 by a set screw 33, as shown at 29. The other end of the spring 28, as shown at 31, is attached to a sleeve 32 rotatable on sleeve 27. Attached to the sleeve 32 by a set screw 37, is a spring release actuating collar arm 34 having an extension 35, to which an arm actuating rod 36 is attached. Thus, rotation of the collar arm 34 will rotate the sleeve 32 on the sleeve 27, so that the internal diameter of the spring 28 is increased. In the normal position, the spring 28 is tightly wound on the rod 14 by its own bias. Now, if the rod 14 is urged in a right-hand direction when the spring is in its normal clamping position on the rod, the right-hand end of the spring is urged against the beveled surface 40 of the sleeve 25, and, as shown in Fig. 5, a shifting of the spring turns occurs, which increases the tightening of the spring about the rod 14. Thus, since the load direction of the rod is toward the right, the locking increases under load, but the lock may be easily released at any time.

Referring to Fig. 3, the collar 34 is rotated to release the spring from the rod 14 by pressure on a finger button 42 against the tension of a spring 43 mounted on the shaft 44 of the button 42. These elements are housed within a casing 45 mounted in the seat side 6. When the shaft 44 is moved to the right, it rotates a crank arm 47 on a pivot 48, urging the connecting release rod 36 upwardly to rotate the spring 28 and release the rod 14. Upon release of the rod, the next portion of the clutch mechanism to be described will move the rod 14 to the left, moving the seat back to one extreme position, which is its upright position.

The mechanism just referred to includes a cylindrical cup or shell 50 fixedly positioned longitudinally of the rod 14, movable therewith, and enclosing one end of a coil spring 51. The other end of the spring 51 abuts an annular flange 53 of a hollow cylindrical cup or shell 54, around which the spring 51 is positioned. The internal end of the shell 54 is beveled as shown at 55, and against which the tapered end of a fiber or plastic friction element 56 is positioned. This element has both ends tapered and has multiple cuts therein, as shown at 57, to permit expansion and contraction of its internal diameter. The other tapered end of the friction element 56 abuts a beveled end 60 of a cylinder 61 within shell 54 and having the other end thereof abutting one leg of the yoke section 9. Thus, the tension of the spring 51 between the collar 53 and the cup 50, determines the amount of friction between the element 56 and the rod 14. That is, the greater the pressure on the ends of element 56, the tighter it grips the rod 14, since its internal diameter is urged smaller.

When the locking spring 28 is rotated and released from the rod 14, the spring 51 will urge the rod 14 to the left, thus restoring the seat back 7 to its extreme upright position. Upon the release of the spring 28, the rod is locked in position against further movement in either direction, although it is more firmly locked against movement in a right-hand direction, as explained above. During movement of the rod to the left, the friction between the element 56 and rod 14 exists to prevent the seat back 7 from snapping to its upright position. Since the spring 51 is expanding, the element 56 will provide a certain minimum grip on the rod 14. When the occupant of the seat desires to move the back 7 to a certain reclining position, the locking spring 28 is again released and the pressure of the occupant against the seat back 7 will move the rod 14 in the right-hand direction. However, this direction of action increases the tension in spring 51 and increases the friction between the element 56 and the rod 14, so that the seat back is under the positive control of the occupant. Thus, the seat back is always under the direct control of the occupant to any reclining position, the locking spring 28 being readily released under load—that is, when the occupant is leaning against it—and the back will not snap suddenly to any other position. If the person in the rear of a seat is suddenly thrown against the back of it, the seat back can move forwardly to cushion the movement of the person and prevent a dangerously fast stop when the back reaches its extreme position. The rod 14 is hard chrome surfaced to minimize wear by action of the spring thereon. However, since the spring is self-restoring to locking position about the rod, there is an automatic compensation for any wear which does occur.

Figure 8:
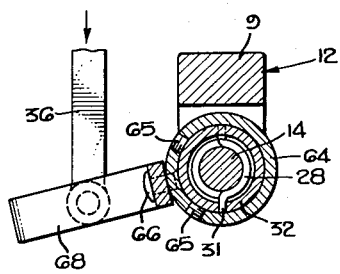
Fig. 8 is a cross-sectional view taken along the line 8—8 of Fig. 7.

Referring now to Figs. 7 and 8, a second release attachment is illustrated, wherein the lock body 12 is shown with the same sleeve elements 23 and 27. In this modification, however, a long sleeve element 64 is attached to the sleeve 27 by set screw 65. To the sleeve 64, is riveted, by rivets 66, an arm 68, to one end of which is attached the lock release actuating arm 36. The other end of arm 36 may be attached to the crank 47 shown in Fig. 3, or any similar moving mechanism.

Figure 9:
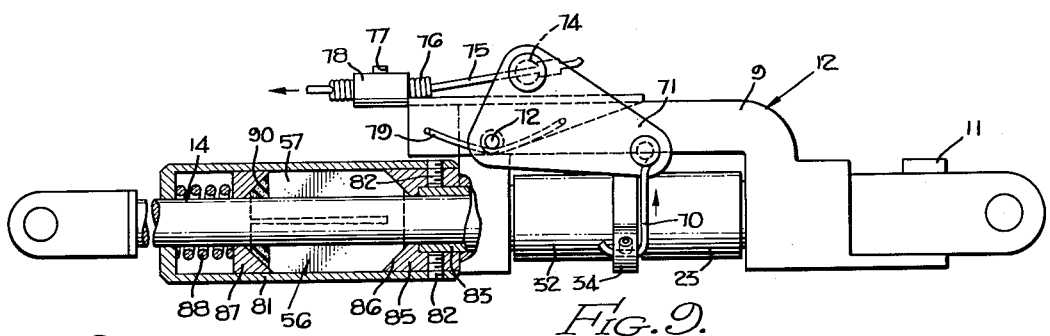
Fig. 9 shows another type of lock release mechanism and a modification of the friction applying mechanism of the invention.

Referring now to Fig. 9, a third release type of mechanism is shown whereby the collar 34 is fastened by a hook 70 to a crank arm 71 pivoted at 72. The point 74 on the crank arm is attached to one end of a Bowden wire 75 having its conduit 76 attached to an extension 78 on the lock body 12 by set screw 77. Now, when the wire 75 is moved in the direction of the arrow, the hook 70 is raised, rotating the collar 34 and releasing the spring 28. To aid in restoring the crank 71, a wire spring 79 is attached to the lock body 12 and crank 71.

The unit shown in Fig. 9 has another feature, which provides a constant snubbing action on the rod 14, regardless of its direction of movement. This is accomplished by a hollow cylinder 81, which is attached by set screws 82 to a sleeve 83 attached to the lock body 12. The set screws 82 pass through a cylinder 85 having an internal beveled end 86. A slidable collar 87 having a beveled end 90 is positioned at the other end of the cylinder 81. Between the other end of collar 87 and the internal end of the cylinder 81, there is a coil tension spring 88. Between the beveled ends 86 and 90, is positioned the friction element 56 shown in Fig. 6. With this construction, the spring 88 will exert a constant snubbing action on the rod 14, regardless of the direction of movement of the rod 14, and in some instances, this is preferable to the variable friction exerted on the rod 14 by the mechanism shown in Fig. 2.

Figure 11:
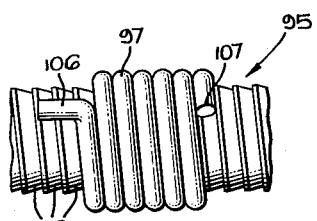
Fig. 11 is a detailed view showing the locking element of the modification shown in Fig. 10.
Figure 10:
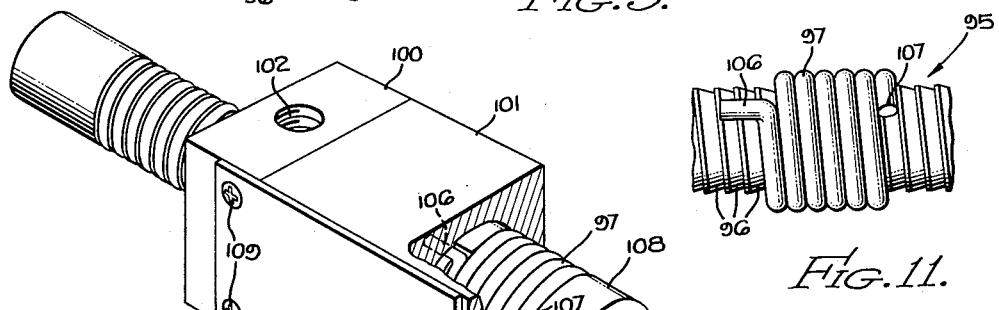
Fig. 10 is a perspective view of another modification of the clutch mechanism.
Figure 12:
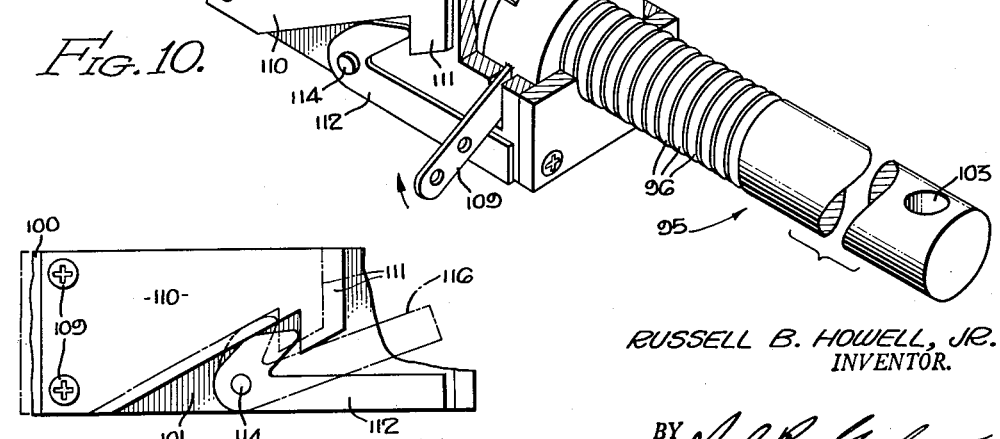
Fig. 12 is a detailed view of the automatic lock release mechanism shown in Fig. 10.

Referring now to Figs. 10, 11, and 12, a second modification of the entire unit is illustrated, but which utilizes the principle of the unit just described. In this modification, the rod 95 has saw-toothed annular grooves 96 milled thereon, around which a spring 97 is wound, the grooves having the same pitch as the spring. Positioned around the rod 95 and through which the rod is adapted to move, are individual body blocks 100 and 101. The block 100 is adapted to be attached in a fixed position to a seat by means in the opening 102, such as shown at 13 in Fig. 1, while a seat back may be attached to the rod at the opening 103, as shown at 15—16 in Fig. 1. The spring 97 has one end attached to the block 101, as shown at 106, while the other end 107 of the spring abuts a shoulder of a collar 108, to which an actuation lever 109 is attached.

Attached to the block 100 at 109 is a latch member 110. Abutting against the notch in the latch end 111, is the end of a hook member 112 attached to and pivoted at 114 on block 101. The lever 109 may be actuated by an arm, such as shown at 36 in the other figures, and so, rotate the arm 109 in the direction shown by the arrow. This increases the diameter of the spring, permitting the rod 95 to slip therethrough and lower the back of the seat to any desired position. When the arm 109 is in normal position, the spring locks in the grooves. It is obvious that the rod 95, as shown in Fig. 11, is positively locked against movement in the left-hand direction, although it can be moved in the right-hand direction by slipping through the spring with the aid of the bevel on the grooves 96.

When the blocks 100 and 101 are separated by movement of a seat back toward its upright position, the hook 112 is rotated as shown by the dotted lines 116 in Fig. 12, which raises lever 109 to expand the spring 97 and permits the rod to move through the spring. This action is referred to as "overriding," and is automatic when it is desired to restore a seat back to its normal upright position. Although the rod could be moved to the right through the spring because of the direction of the bevels, this action is aided by the separation of the blocks 100 and 101, which increases the internal diameter of the spring 97.

I claim:

1. A clutch mechanism comprising a rod movable substantially axially, a fixed member adjacent one end of said rod, a member rotatable around said rod, a spring around said rod and having a respective end attached to each of said members, said spring being normally biased to grip said rod, means for rotating said rotatable member to release the grip of said spring on said rod to permit axial movement of said rod through said spring, and means contacting one end of said spring for increasing its grip on said rod when said rod is urged in one certain direction.

2. A clutch mechanism in accordance with claim 1, in which a frictional member surrounds said rod, and a pair of elements around said rod and contacting the ends of said frictional member for variably increasing the friction between said frictional member and said rod depending upon the direction of movement of said rod with respect to said frictional member.

3. A clutch mechanism in accordance with claim 1, in which are provided a member attached to the other end of said rod, a spring urging the separation of said fixed member and said member attached to said rod, a friction element on said rod between said two members, a spring, and means for exerting the tension in said spring against the ends of said element to determine the friction between said element and said rod, said friction varying in accordance with the direction of movement of said rod with respect to said friction element.

4. A clutch mechanism in accordance with claim 1, in which said last mentioned means is a sleeve on said rod having a beveled end surface to bias the turns of said spring against said rod when said spring is forced against said surface.

5. A seat back adjusting mechanism for controlling the positioning of the back of the seat with respect to said seat comprising a rod movable substantially longitudinally in two directions, a fixed member, a spring for locking said rod to said fixed member, means attached to said fixed member for increasing the locking action of said spring on said rod when said rod is urged in one of said directions, and means on said rod for braking the movement of said rod through said spring, said braking action being greater when said rod is moved in one direction than when said rod is moved in the opposite direction.

6. A seat back adjusting mechanism in accordance with claim 5, in which one end of said rod is attached to said back of said seat for adjusting the position thereof and said fixed member is attached to a stationary portion of said seat.

7. A seat back adjusting mechanism in accordance with claim 5, in which means are provided for rotating said spring for releasing said spring from said rod.

8. A seat back adjusting mechanism in accordance with claim 5, in which said last mentioned means includes a second spring urging the separation of said fixed member and one end of said rod, and a friction element on said rod whose friction on said rod varies with the tension in said second spring, said second spring extending and contracting according to the direction of movement of said rod, the friction between said rod and element being less when said spring is extending than when said spring is contracting.

9. A seat back adjusting mechanism in accordance with claim 5, in which said last mentioned means includes a friction element around said rod, and a second spring having predetermined tensions therein depending upon the direction of movement of said rod.

10. A clutch mechanism comprising a rod having annular beveled notches, a spring surrounding said rod, said notches having the same pitch as said spring, a fixed member through which said rod is slideable, a movable member surrounding said rod and normally in contact with said fixed member, an arm connected to one end of said spring for rotating said spring to expand the internal diameter thereof and release said spring from said rod, and means on said fixed and movable members interconnecting said fixed member and said arm for rotating said arm when said fixed member and movable member are separated.

11. A clutch mechanism in accordance with claim 10, in which said last mentioned means includes a latch attached to said fixed member and a hook member pivoted on said movable member and in contact with said latch and said arm.

12. A chair back adjusting mechanism, comprising a rod movable substantially axially in two directions, a member attached to a fixed portion of said chair and through which said rod is movable, means for connecting one end of said rod to said chair back, a spring around said rod and biased to grip and hold said rod in any adjusted position of said back, means connecting said chair and said spring for rotating one end of said spring to release said spring from said rod, and means for applying a variable frictional drag on said rod as said rod is moved by adjustment of said back, said drag being greater when said rod is moved in one direction than when said rod is moved in the opposite direction.

13. A chair back adjusting mechanism in accordance with claim 12, in which said last mentioned means includes a second spring having one end movable axially with said rod and a friction element surrounding said rod, said spring exerting a varying pressure on said friction element in accordance with the direction of movement of said rod.

14. A chair back adjusting mechanism in accordance with claim 12, in which said last mentioned means includes a second spring surrounding said rod and a friction element surrounding said rod, said second spring exerting pressure on the ends of said element to maintain a predetermined friction between said rod and said element dependent upon the direction of movement of said rod with respect to said element.

15. A clutch mechanism comprising a rod movable substantially longitudinally, a fixed member adjacent one end of said rod, a member rotatable around said rod, a spring around said rod and having a respective end attached to each of said members, said spring being normally biased to grip said rod, and means for rotating said rotatable member to release the grip of said spring on said rod to permit longitudinal movement of said rod through said spring in one direction.

References Cited in the file of this patent

UNITED STATES PATENTS

| | | |
|---|---|---|
| 1,616,082 | Garrett | Feb. 1, 1927 |
| 2,112,265 | Bradfield | Mar. 29, 1938 |
| 2,194,120 | Haslup | Mar. 19, 1940 |
| 2,283,485 | Beck | May 19, 1942 |
| 2,529,617 | Kunkel | Nov. 14, 1950 |
| 2,579,305 | Cushman | Dec. 18, 1951 |

FOREIGN PATENTS

| | | |
|---|---|---|
| 459,915 | Italy | Oct. 11, 1950 |